Patented June 17, 1941

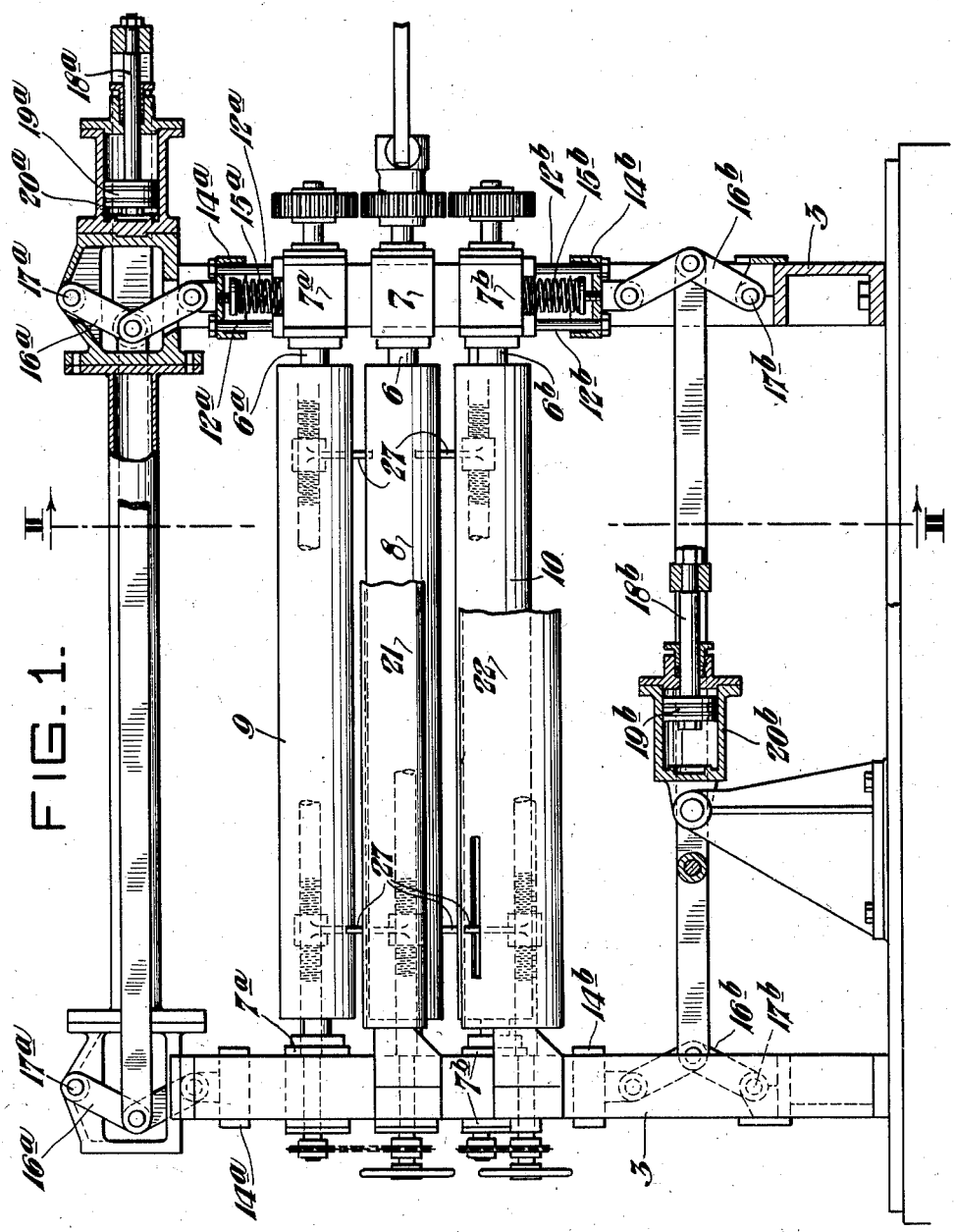

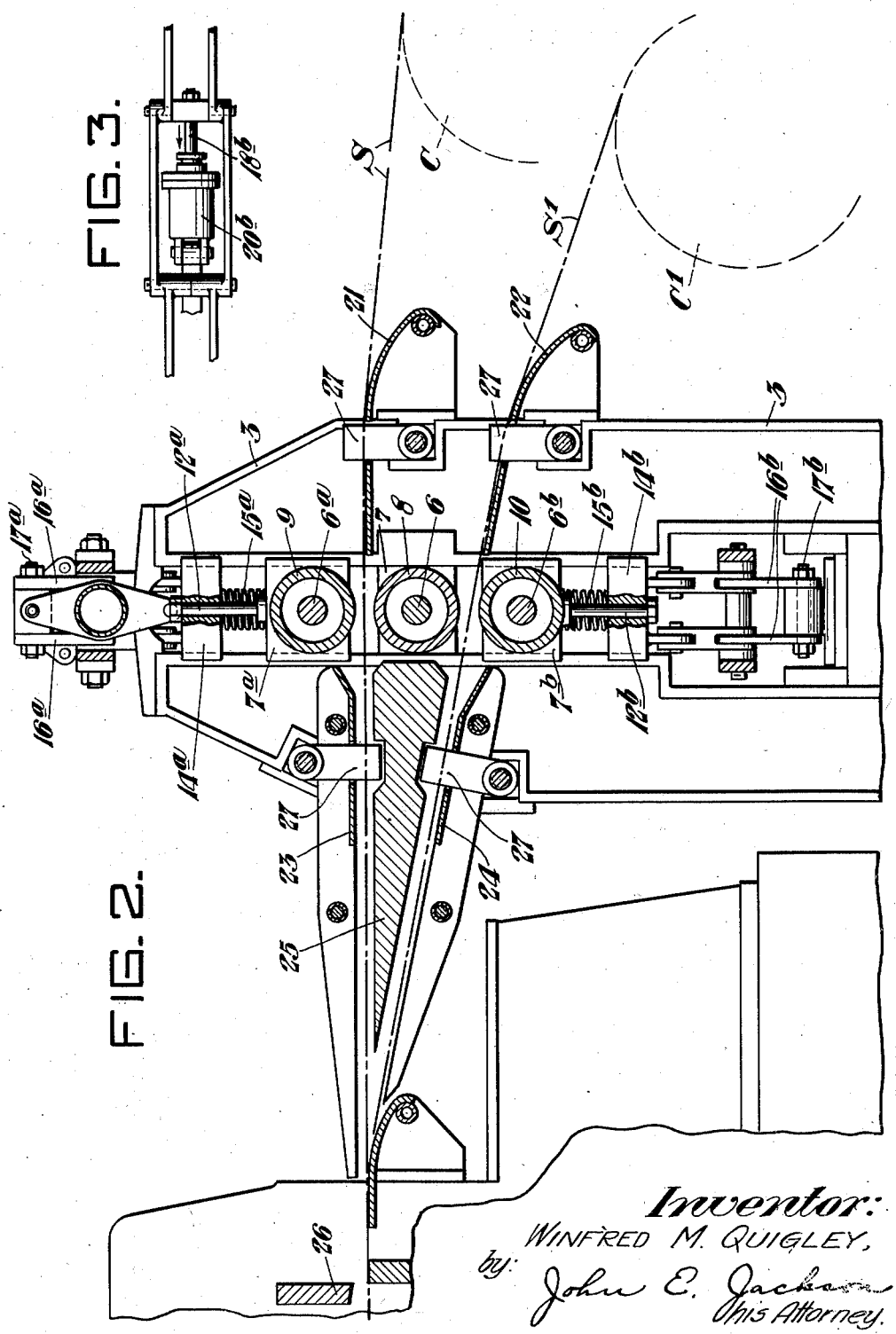

2,246,456

UNITED STATES PATENT OFFICE 2,246,456

STRIP FEEDING DEVICE

Winfred M. Quigley, West View, Pa., assignor to Carnegie-Illinois Steel Corporation, a corporation of New Jersey Application April 28, 1939, Serial No. 270,705

1 Claim. (Cl. 271—2.3)

The present invention relates to a feeding device for positioning the ends of strip material in a manner that they can be readily joined together to form a continuous strip with a minimum amount of handling and within a minimum amount of time.

In the continuous processing of strip material, the ultimate efficiency of the process is developed by joining the end of the incoming material to the end of the outgoing or processed material. In this manner, rethreading of the machine is avoided and material can be continuously and without interruption fed into and through the various processing steps. In general, this is accomplished by supplying two or more unreeling devices at the entry end of the continuous equipment. Thus, a reserve supply of strip material in coiled form is maintained in position for uncoiling so that its free end can be joined with the rear end of the material already passing through the processing steps.

In prior practice, before the ends of material could be properly positioned for joining, it was necessary to wait until the end of one coil was approached before the operator proceeded to pull the end of a new coil from the reel to position it, by hand, under the shearing mechanism. After shearing, it was necessary to further move the front end of the incoming strip in correct welding position with the end of the outgoing strip.

Such an operation required considerable time, due to the manual labor necessary, and prevented high speed production. The time required to effect the shearing and securing of the outgoing and incoming ends of the material was excessive. Further, in general, the shearing and welding operation required that the ends of the material be stopped. In order that such stoppage did not necessitate the complete suspension of processing operation, a looping pit or slack producing means between the joining steps and the main processing steps was provided. Such a looping pit or slack producing means permitted the end of the outgoing material to be stopped for the joining operations without affecting the forward movement through the processing equipment. Time required by the manual labor to bring the ends together for joining has necessitated a slack producer of excessive size. Furthermore, the nature of the material being handled made it difficult to manually handle, resulting in a further loss of time.

To eliminate the manual operation, a two-high pinch feed roll has been used. However, with such a construction, it was necessary to wait for the rear end of the outgoing material to pass through the pinch rolls before the front end of the incoming material could be entered through the same pinch rolls and therefore delay resulted in securing the ends together.

An object of the present invention is to provide a strip feeding device which will permit positioning of the front end of the incoming coil at any time during the feeding of the outgoing coil of material.

Another object of the present invention eliminates manual labor and minimizes the time lost in attaching the rear end of the outgoing material to the front end of the incoming material only to the extent of that required by the shearing and attaching mechanism.

A further object of the present invention resides in providing means for flexible movement of the incoming material to correctly position the same for attachment to the rear end of the outgoing material for shearing and attaching.

Other objects and advantages will become apparent as the description proceeds and reference is had to the accompanying drawings, in which:

Figure 1 is a side elevation partly in section of the present invention;

Figure 2 is a sectional elevation on line I—II of Figure 1; and

Figure 3 is a detailed plan of the lever actuating mechanism.

In the drawings, there is shown the apparatus of the present invention receiving coiled strip material S. The apparatus includes a base plate upon which is mounted parallel opposed housings 3, each of which is provided with windows for receiving the shafts 6, $6^a$ and $6^b$ and bearings 7, $7^a$ and $7^b$ for the rolls. Positioned within the housing windows is a center roll 8 rigidly supported thereon and adjustable rolls 9 and 10 positioned on each side of the center roll 8. These adjustable rolls 9 and 10 on each side of the center roll 8 are mounted in such a manner that they may be vertically advanced or retracted selectively to engage or disengage the center roll 8. The shafts $6^a$ and $6^b$ of the vertically movable rolls 9 and 10 are supported by bearing boxes $7^a$ and $7^b$, which in turn are connected by means of adjustable bolts $12^a$ and $12^b$ to compressor plates $14^a$ and $14^b$, and between said compressor plates and bearing boxes are suitably positioned compression springs $15^a$ and $15^b$. Such a construction permits fine adjustment of the vertically movable rolls.

Connected to the compression plates 14ᵃ and 14ᵇ of the vertically adjustable rolls 9 and 10, are toggle link arrangements 16ᵃ and 16ᵇ having pivotal connection with bearings 17ᵃ and 17ᵇ. The toggle link arrangements 16ᵃ and 16ᵇ are pivotally secured to piston rods 18ᵃ and 18ᵇ of pistons 19ᵃ and 19ᵇ operating within cylinders 20ᵃ and 20ᵇ for the respective top and bottom toggle arrangements, so that when pressure is applied to the interior of the proper cylinder, the movement of the piston carries with it the rod and toggle arrangement for moving the selected adjustable roll vertically with respect to the fixed center roll 8.

On the entry side of the apparatus there is positioned, in any conventional manner, upper and lower guide members 21 and 22, respectively, which are faced with a non-abrasive material such as felt, carpet or the like, and over which the strip is adapted to pass and be converged between the rolls. At the exit side of the apparatus, there is provided a guiding unit which includes top and bottom guide members 23 and 24, respectively, between which is positioned a complementary guide member 25 in cooperation with both the top and bottom guide members, so that the pass lines of the strip material converge to a common point adjacent the shearing mechanism, generally designated at 26. At both the entrance and exit end of the apparatus, there are provided adjustably mounted bronze-faced side guides 27 on both the top and bottom guide members, which prevent lateral shifting of the material during its travel through the apparatus and whose adjustment permits use of varied widths of strip material.

The rolls are driven from any source of power and have interconnected gearing for driving the rolls in synchronism.

The three rolls forming the feeding means for the strip material are capable of being rotated in a forward and reverse direction.

According to the mode of operation of the present invention, the strip material S which is being processed is illustrated as being pulled from coil C and entering the machine between the top vertically adjustable roll 9 and the fixed center roll 8, while the strip material S' to be subsequently joined, at the proper time, to the outgoing end of the strip S, is shown as being fed from its coil C' over the lower entrance guide member 22 into and between the lower adjustable roll 10 and the center roll 8. At any time during the processing of the strip S, pressure may be supplied to the lower cylinder 20ᵇ so as to move the toggle arrangement 16ᵇ to raise the bottom roll 10 into contact with the incoming end of the new coil S' and the center roll 8. By movement of the rolls 8 and 10, the strip material S' can be advanced through the guide members 24 and 25, at the exit end of the machine, into a position immediately beneath the strip S, and in close proximity to the shearing mechanism 26. When the rear end of the strip S arrives, it can be immediately sheared at 26; pressure can then be applied as to the upper cylinder 20ᵃ and the upper roll 9 moved into contact with the trailing end of the strip S and the center roll 8. The lower roll 10 being in contact with the center roll 8 and the strip S', the contact of roll 9 with the sheared scrap end of strip S will, when feeding the strip S' to the shearing mechanism 26, move the scrap end of the sheared strip S in a reverse direction and out of the machine. Should the end of the incoming strip of material S' be advanced beyond the point of shearing, it is possible, by reversing the rotation of rolls 8 and 10, to move the material backwardly to the desired position.

By providing a construction including a fixed rotatable center roll and vertical adjustable rolls on each side of said center roll, it is possible to feed the incoming end of the new coil into the machine and in a proper position adjacent the material being processed at any time during the processing of the strip. Thus, upon the approach of the rear end of the strip being processed which is termed the outgoing material, the necessary shearing and joining operations can be, at the proper time, accomplished with a minimum amount of time and labor. If the strip being processed is being fed between the bottom and center rolls 8 and 10, respectively, the incoming end of the new strip can be properly positioned by the top roll 9 and center roll 8.

While I have shown and described a specific embodiment of the present invention, it will be seen that I do not wish to be limited exactly thereto, since various modifications may be made without departing from the scope of the invention, as defined by the following claim.

I claim:

An apparatus for feeding a plurality of metallic strips into position for shearing and attaching of the rear end of the outgoing material to the front end of the incoming material, which comprises superimposed rotatable feed rolls, the center roll being freely rotatable in a fixed position, means for selectively moving either roll on either side of the fixed center roll for feeding material therebetween, and means for guiding and converging the pass line of said material to a common point of conversion, said guiding and converging means for the pass lines including top and bottom guide plates and an intermediately positioned guide member cooperating with the top and bottom plates to direct the material to the common point of conversion.

WINFRED M. QUIGLEY.